United States Patent [19]
Henry et al.

[11] Patent Number: 5,889,899
[45] Date of Patent: Mar. 30, 1999

[54] ARTICLE COMPRISING A BRAGG REFLECTIVE MACH-ZEHNDER FILTER OF REDUCED COUPLED DEPENDENCE

[75] Inventors: Charles Howard Henry, Skillman; Christi Kay Madsen, South Plainfield; Thomas A. Strasser, Warren, all of N.J.

[73] Assignee: Lucent Technologies Inc., Murray Hill, N.J.

[21] Appl. No.: 950,899

[22] Filed: Oct. 15, 1997

[51] Int. Cl.⁶ .............................. G02F 1/295; G02B 6/34
[52] U.S. Cl. .................. 385/10; 385/3; 385/37; 359/130
[58] Field of Search ...................... 385/10, 3, 16, 385/18, 30, 31, 37, 129; 359/115, 124, 127, 130, 161, 183, 195

[56] References Cited

U.S. PATENT DOCUMENTS

| | | | |
|---|---|---|---|
| 5,502,782 | 3/1996 | Smith | 385/10 |
| 5,581,642 | 12/1996 | Deacon et al. | 385/10 |
| 5,636,309 | 6/1997 | Henry et al. | 385/129 |
| 5,793,908 | 8/1998 | Mizuochi et al. | 385/31 |

*Primary Examiner*—Hemang Sanghavi
*Attorney, Agent, or Firm*—Mathews, Collins, Shepherd & Gould, P.A.

[57] ABSTRACT

A Brag reflective Mach-Zehnder filter has arms that introduce a $\pi$ phase difference in transmission but not in reflection. In one embodiment a $\pi$ phase difference is introduced in one of the two arms between the Bragg grating and one of the couplers. In another embodiment, a phase difference of $\pi/2$ is introduced in one arm both before and after the grating and the location of the grating in the other arm is shifted. The transmission of the resulting filter is substantially independent of the degree of coupling at the input and the output. WDM systems employing the new filters are also disclosed.

9 Claims, 4 Drawing Sheets

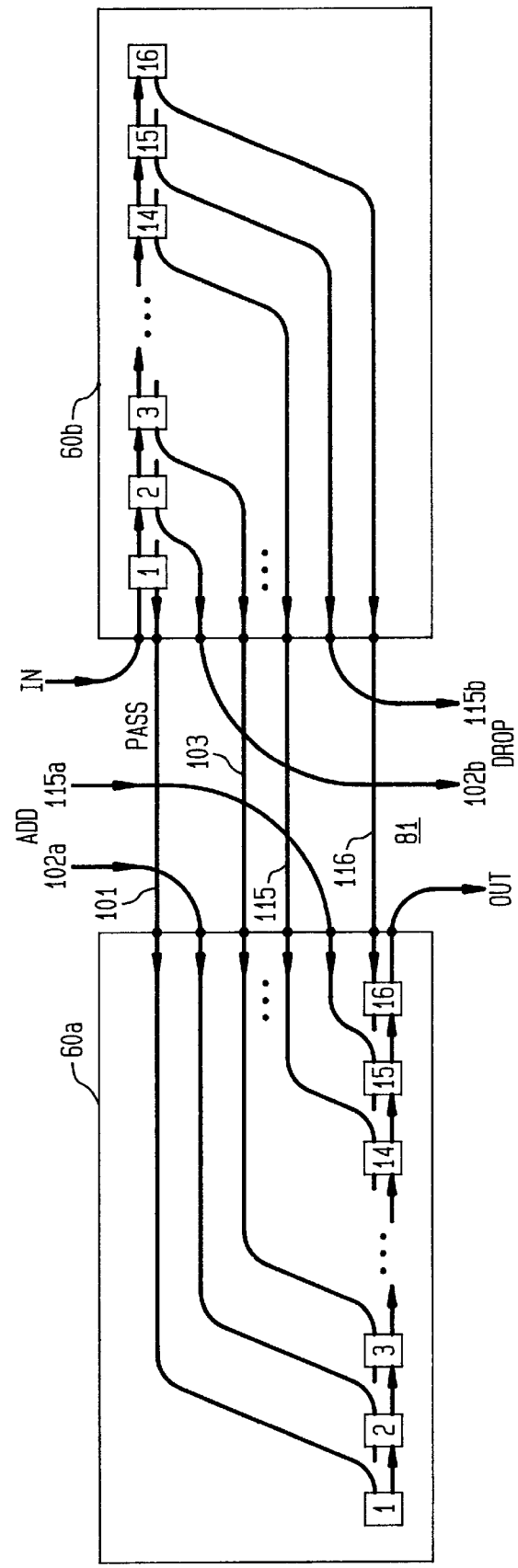

5,889,899

ARTICLE COMPRISING A BRAGG REFLECTIVE MACH-ZEHNDER FILTER OF REDUCED COUPLED DEPENDENCE

FIELD OF THE INVENTION

This invention relates to a Bragg reflective Mach-Zehnder filter having reduced coupler dependence and to articles, such as wavelength division multiplexers, employing such filters.

BACKGROUND OF THE INVENTION

Mach-Zehnder filters are optical waveguide devices used in a variety of optical communications applications. A typical Mach-Zehnder filter comprises a pair of optical waveguides (interferometer arms) extending between two coupling regions. In the coupling regions, the cores of the respective waveguides are disposed sufficiently close together to permit evanescent-field coupling. In the region between the couplers, the waveguides are disposed sufficiently far apart that no evanescent coupling occurs. Each of the interferometer arms includes a refractive index Bragg grating, and the two interferometer arms are conventionally of equal length.

An improved Mach-Zehnder filter is disclosed in the U.S. Pat. No. 5,636,309 issued to applicant C. H. Henry et al. on Jun. 3, 1997. In this improved filter the spaced apart arms are sufficiently close together that a Bragg grating can be simultaneously written in both arms, providing nearly identical gratings in both arms. The patent further describes articles employing the new filters such as add-drop filters and wavelength division multiplexers (WDMs).

One shortcoming of conventional Mach-Zehnder filters is that ideal operation can be achieved only approximately. Significant causes for non-ideal operation are imperfect 3 dB couplers, non-identical gratings in the two interferometer arms, and inadvertently unequal path lengths. The device of the aforementioned U.S. Pat. No. 5,636,309 patent substantially eliminates non-identical gratings, but ideal operation strongly depends on precisely balanced 3 dB couplers. Accordingly there is a need for a new Mach-Zehnder filter of reduced coupler dependence.

SUMMARY OF THE INVENTION

In accordance with the invention, a Bragg reflective Mach-Zehnder filter has arms that introduce a $\pi$ phase difference in transmission but not in reflection. In one embodiment a $\pi$ phase difference is introduced in one of the two arms between the Bragg grating and one of the couplers. In another embodiment, a phase difference of $\pi/2$ is introduced in one arm both before and after the grating and the location of the grating in the other arm is shifted. The transmission of the resulting filter is substantially independent of the degree of coupling at the input and the output. WDM systems employing the new filters are also disclosed.

BRIEF DESCRIPTION OF THE DRAWINGS

The advantages, nature and various additional features of the invention will appear more fully upon consideration of the illustrative embodiments in with the accompanying drawings. In the drawings:

FIG. 8 is an add-drop multiplexer composed of the improved filters.

It is to be understood that these drawings are for purposes of illustrating the concepts of the invention and, except for the graphs, are not to scale.

DETAILED DESCRIPTION

Figure 1:
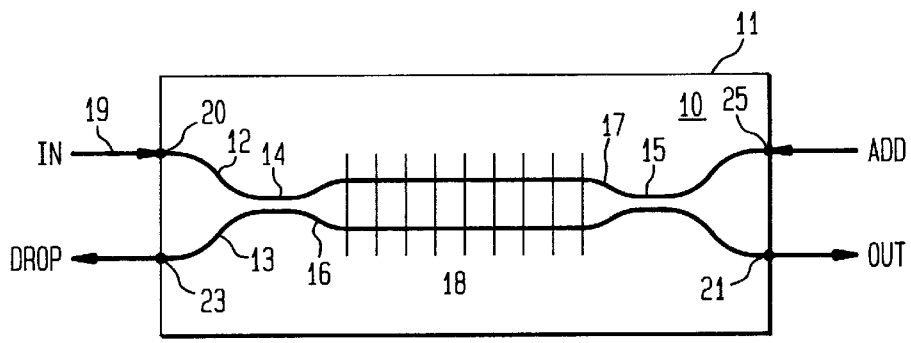
FIG. 1, which is prior art, schematically depicts a conventional Mach-Zehnder filter.

Referring to the drawings, FIG. 1, which is prior art, depicts a Mach-Zehnder filter 10 on a substrate 11. The filter is a four terminal device comprising two substantially identical planar waveguides 12, 13. The waveguides are configured to form two coupling regions 14, 15. The waveguide segments 16, 17 between the couplers are referred to as the interferometer arms. The arms are spaced sufficiently far apart that coupling between them is negligible. They are spaced sufficiently close together that common Bragg grating 18 can be written on both of them.

The Bragg grating 18 has essentially equal strength in both arms. This is accomplished in accordance with the aforementioned U.S. Pat. No. 5,636,309 by simultaneously exposing both arms to UV radiation in a grating pattern through a single phase mask.

In conventional operation, a multiplicity of optical WDM signal channels 19 are provided to input port 20. Wavelengths that are not resonant with the grating 18 propagate through the grating to port 21. A wavelength resonant with the grating is reflected and exits through port 23.

Ideally no signal radiation leaves device 10 through ports 25 or 20. As a practical matter, however, these ideal characteristics can only be approximated. A significant cause for non-ideal operation is imperfection in 3 dB couplers 14, 15.

Figure 2:
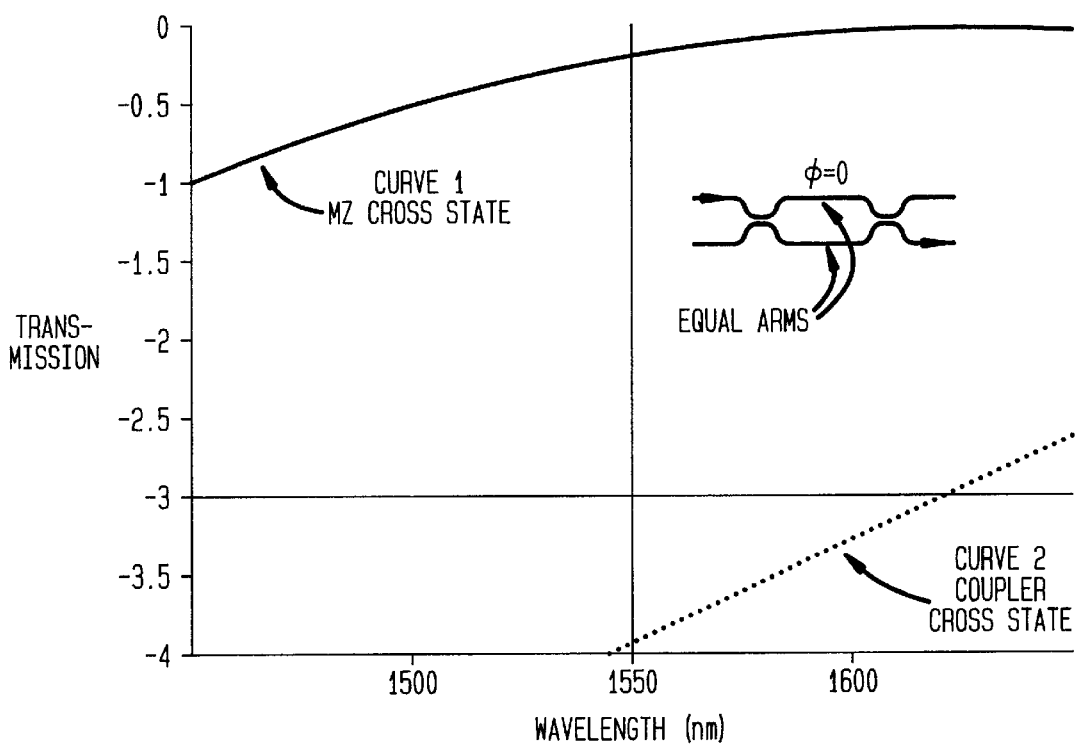
FIG. 2 is a graphical illustration showing the coupler dependence of the conventional filter of FIG. 1.

FIG. 2 provides a graphical illustration of the coupler dependence of the conventional device of FIG. 1. Assuming that for a 1550 nm device the couplers 14, 15 are 5% off the ideal 50—50 division, the transmission from port 20 to port 21 (the MZ cross state transmission) is calculated and plotted as curve 1. Similarly, the transmission through a single coupler (the coupler cross state) is calculated and plotted as curve 2. The result is that curve 1 drops below unity at 1550 nm, exhibiting a small loss that would significantly accumulate for a signal propagating through a chain of many such filters. For example, suppose the loss of each filter is 0.2 dB due to errors in coupling length for a 16 channel WDM. Then at least one channel will pass through 15 filters and acquire a loss of 0.2×15=3.0 dB. Such a loss is unacceptable in currently envisioned optical communications systems.

Figure 3:
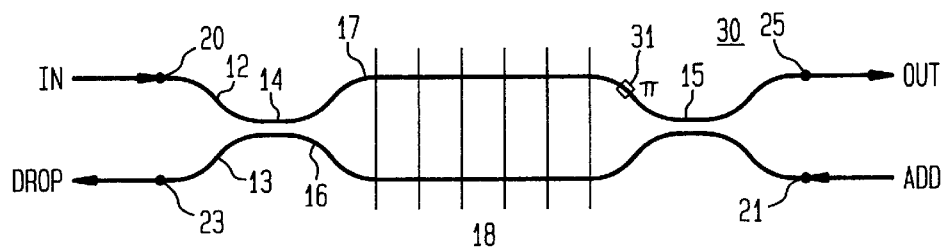
FIG. 3 illustrates a first embodiment of a Mach-Zehnder filter in accordance with the invention.

FIG. 3 depicts a Bragg reflective Mach-Zehnder filter 30 of reduced coupler dependence. Like the conventional device of FIG. 1, filter 30 comprises a pair of waveguides 12, 13 forming two coupling regions 14, 15 and having interferometer arms 16, 17, each including Bragg gratings 18 of equal strength. The two coupling regions should divide the signal by the same ratio but in this device it is not critical that the ratio be 3 dB. Filter 30 differs from the conventional filter 10 in that the arms introduce a $\pi$ phase difference in transmission, but not in reflection. This is represented as by a $\pi$ phase shifter 31 disposed in one of the two arms, e.g. 17, between the Bragg grating 18 and one of the couplers, e.g.

15. The preferred method providing this phase shift is by increasing the path length of arm 17 as compared with arm 16. This can be conveniently accomplished by shifting the coupler 15 downward toward arm 16.

Figure 4:
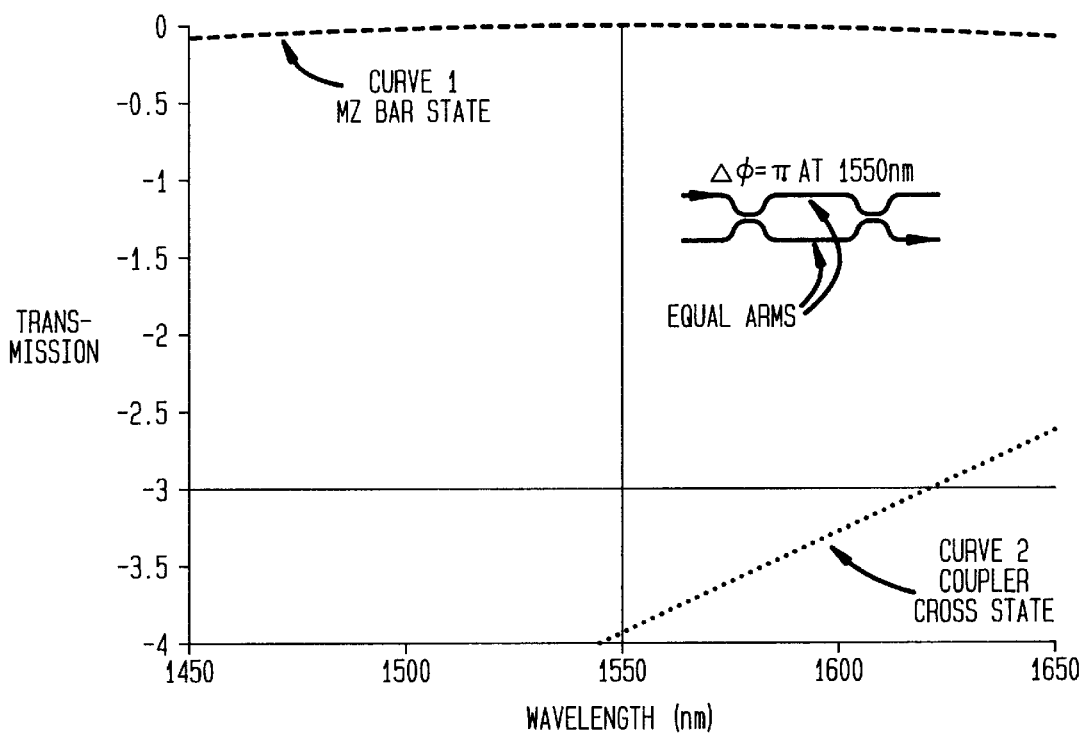
FIG. 4 is a graphical illustration showing the reduced coupler dependence of the FIG. 3 filter.

The result of this added phase shift difference can be seen by reference to FIG. 4 which shows the calculated bar state transmission (curve 1) and coupler transmission (curve 2) for the FIG. 3 device. The bar state transmission loss is negligible over a broad wavelength range centered about 1550 nm, the wavelength for which site arms have exactly a π phase difference. The peak transmission is unaffected by the value of the couplers.

Figure 5:
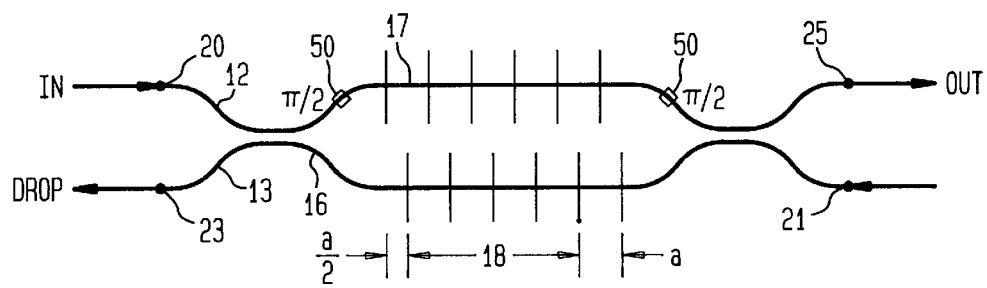
FIG. 5 illustrates a second embodiment of a Mach-Zehnder filter having reduced coupler dependence.

FIG. 5 depicts an alternative embodiment of the improved Mach-Zehnder filter wherein phase changes of π/2 as by phase shifters 50 are introduced in one arm e.g. 17 both before and after the grating 18. The phase change before the grating causes a π phase delay in the reflected wave. An equal phase change (within 2π) is introduced in the wave Bragg reflected in the other arm by shifting the grating ½ period in either direction. The sign of the shift does not matter. For a first order Bragg reflector, each additional period causes a round trip phase delay of 2π so half a period adds a phase delay of π to the reflected wave but no phase delay to the transmitted wave.

Figure 6:
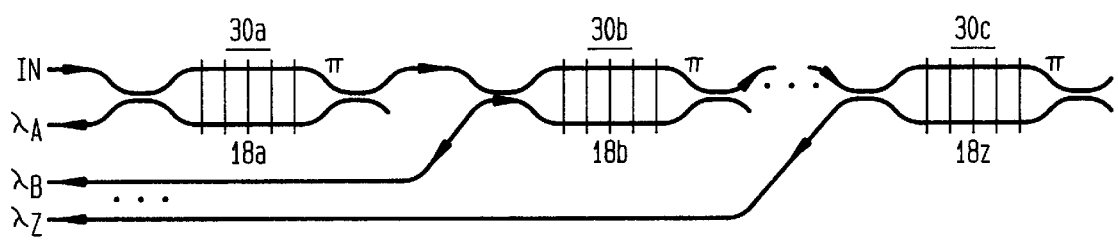
FIG. 6 is a WDM composed of the improved filters.

FIG. 6 is a wave division multiplexer 60 composed of interconnected Mach-Zehnder filters having reduced coupler dependence. In essence, the multiplexer comprises a chain of the improved filters 30A, 30B, . . . , 30Z with port 25 of each filter connected to port 20 of the succeeding filter.

The Bragg gratings 18A, 18B, . . ., of successive filters are constructed to reflect wavelengths of different WDM channels $\lambda_A, \lambda_B, \ldots, \lambda_Z$. To minimize transmission losses, the filters and their Bragg gratings should be ordered so that signals pass first through the filter of shortest Bragg wavelength, then through the filter of next shortest Bragg wavelength, etc. i.e. $\lambda_A < \lambda_B < \ldots < \lambda_Z$. With this arrangement, signals pass only through Bragg reflectors on the long wavelength side of the stop band. The signal is completely reflected before it encounters filters for which it would be on the short wavelength side of the stop band. In the WDM of FIG. 6 the reflected signals all return via ports 23 on one side of the chain of filters.

Figure 7:
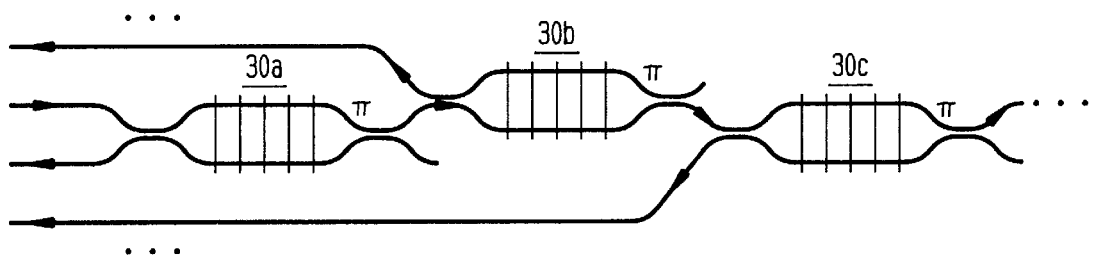
FIG. 7 is a second embodiment of a WDM.

FIG. 7 is an alternative embodiment of a WDM employing the improved filters wherein the reflected signals are returned via ports 23 on both (alternating) sides of the chain of filters.

FIG. 8 illustrates an add-drop multiplexer 80 made using Bragg reflective Mach-Zehnder filters of reduced coupler dependence. In essence the add-drop multiplexer 80 comprises a pair of WDMs 60A and 60B connected by jumper fibers. If the jumpers are connected together, e.g. 101, 103, 114 or 116, the channel is passed. If the jumpers are broken, e.g. 102A and 102B or 115A and 115B, the respective channels can be added or dropped. The jumpers can be replaced by electrically controlled optical switches.

The path length of a signal on each WDM depends on where in the chain it is dropped and added. The losses are due mainly to propagation. Thus the losses are nearly proportional to the path length, and they can be expected to range from 1 to 4 dB for a 16 channel multiplexer. The worst case loss can be minimized by making the filter sequence in the second WDM opposite to that of the first. Then the channel having the longest path length in one WDM has the shortest in the other, etc. With this complementary arrangement, each channel will experience a total loss of 5 dB.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. An article comprising a Bragg reflective Mach-Zehnder filter comprising two planar optical waveguides, each waveguide comprising an interferometer arm extending between two coupling regions, with a refractive index Bragg grating in each interferometer arm, said filter receiving an optical input signal into one of said waveguides and providing a transmitted signal through said Bragg gratings and reflected signals reflected by said Bragg gratings, CHARACTERIZED IN THAT
said interferometer arms introduce a π phase difference in the transmitted signals but no phase difference in the reflected signals.

2. An article according to claim 1 wherein a π phase difference is introduced in one of the two arms between the Bragg grating in said arm and a coupling region.

3. An article according to claim 1 wherein a π/2 phase difference is introduced in one of the two arms both upstream and downstream of the Bragg grating in said arm and wherein the Bragg grating in the other of the two arms is shifted downstream.

4. A wavelength division multiplexer comprising a plurality of interconnected devices according to claim 1.

5. A wavelength division multiplexer comprising a plurality of interconnected devices according to claim 2.

6. A wavelength division multiplexer comprising a plurality of interconnected devices according to claim 3.

7. An add/drop multiplexer comprising a pair of interconnected wavelength division multiplexers, each comprising a plurality of interconnected devices according to claim 1.

8. An add/drop multiplexer comprising a pair of interconnected wavelength division multiplexers, each comprising a plurality of interconnected devices according to claim 2.

9. An add/drop multiplexer comprising a pair of interconnected wavelength division multiplexers, each comprising a plurality of interconnected devices according to claim 3.

* * * * *